(12) United States Patent
Boehm et al.

(10) Patent No.: US 11,059,102 B2
(45) Date of Patent: Jul. 13, 2021

(54) METHOD FOR PRODUCING COMPONENTS FROM A DUPLEX STEEL, AND COMPONENTS PRODUCED USING SAID METHOD

(71) Applicant: KSB SE & CO. KGaA, Frankenthal (DE)

(72) Inventors: Alexander Boehm, Frankenthal (DE); Stephan Braun, Frankenthal (DE); Holger Rauner, Frankenthal (DE); Bernd Schramm, Frankenthal (DE); Adrian Stein, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 242 days.

(21) Appl. No.: 16/085,472

(22) PCT Filed: Mar. 15, 2017

(86) PCT No.: PCT/EP2017/056056
§ 371 (c)(1),
(2) Date: Sep. 14, 2018

(87) PCT Pub. No.: WO2017/157978
PCT Pub. Date: Sep. 21, 2017

(65) Prior Publication Data
US 2019/0084043 A1  Mar. 21, 2019

(30) Foreign Application Priority Data

Mar. 15, 2016 (DE) .................... 10 2016 003 105.0
Mar. 13, 2017 (DE) .................... 10 2017 204 099.8

(51) Int. Cl.
*B22F 10/20* (2021.01)
*B22F 3/24* (2006.01)
(Continued)

(52) U.S. Cl.
CPC ................ *B22F 10/20* (2021.01); *B22F 3/24* (2013.01); *C21D 1/28* (2013.01); *C21D 6/00* (2013.01);
(Continued)

(58) Field of Classification Search
CPC .... B22F 3/1055; B22F 3/24; B22F 2003/248; B22F 2998/10; B22F 2999/00;
(Continued)

(56) References Cited

U.S. PATENT DOCUMENTS

| | | |
|---|---|---|
| 3,859,086 A | 1/1975 | Church et al. |
| 10,011,894 B2 | 7/2018 | Ikeda et al. |

(Continued)

FOREIGN PATENT DOCUMENTS

| | | |
|---|---|---|
| DE | 2 263 858 A | 7/1973 |
| DE | 10 2015 011 013 A1 | 2/2016 |

(Continued)

OTHER PUBLICATIONS

Davidson K., et al., "Selective Laser Melting of Duplex Stainless Steel Powders: An Investigation", Materials and Manufacturing Processes, Sep. 30, 2015, vol. 31, No. 12, pp. 1543-1555 (1-13) (Year: 2015).*

(Continued)

*Primary Examiner* — Anthony J Zimmer
*Assistant Examiner* — Dean Mazzola
(74) *Attorney, Agent, or Firm* — Crowell & Moring LLP

(57) ABSTRACT

A method for producing components from a duplex steel, and a component formed by the method, are provided. A powder-type duplex steel starting material including an austenitic phase and a ferritic phase is laser melted in successive layers to form a component. The melted and re-solidified component is then subjected to heat treatment to obtain solution annealing of the austenitic phase at a (Continued)

temperature range of between 850° C. and 1,100° C. for a predetermined dwell time, after which the component is cooled and the component has a grain size and grain size number G of at least 9 according to ASTM. The grain size and the grain size number G of the austenitic phase are influenced by the selection of the respective maximum temperature and/or the dwell time of the maximum temperature.

8 Claims, 3 Drawing Sheets

(51) Int. Cl.

| | |
|---|---|
| *C22C 33/02* | (2006.01) |
| *C22C 38/04* | (2006.01) |
| *C21D 6/00* | (2006.01) |
| *C22C 38/02* | (2006.01) |
| *C22C 38/00* | (2006.01) |
| *C22C 38/42* | (2006.01) |
| *C21D 10/00* | (2006.01) |
| *C21D 1/28* | (2006.01) |
| *C22C 38/44* | (2006.01) |
| *B33Y 10/00* | (2015.01) |
| *B33Y 70/00* | (2020.01) |

(52) U.S. Cl.
CPC ............ *C21D 6/004* (2013.01); *C21D 10/00* (2013.01); *C22C 33/02* (2013.01); *C22C 33/0207* (2013.01); *C22C 38/001* (2013.01); *C22C 38/02* (2013.01); *C22C 38/04* (2013.01); *C22C 38/42* (2013.01); *C22C 38/44* (2013.01); *B22F 2003/248* (2013.01); *B22F 2998/10* (2013.01); *B33Y 10/00* (2014.12); *B33Y 70/00* (2014.12); *C21D 2211/001* (2013.01); *C21D 2211/005* (2013.01); *Y02P 10/25* (2015.11)

(58) Field of Classification Search
CPC ............... B22F 10/20; C21D 2211/001; C21D 2211/005; C21D 1/26; C21D 1/28; C21D 6/00; C21D 6/001; C21D 6/002; C21D 6/004; C21D 6/005; C21D 6/008; C21D 10/00; C22C 33/02; C22C 33/0207; C22C 38/00; C22C 38/001; C22C 38/02; C22C 38/04; C22C 38/08; C22C 38/12; C22C 38/18; C22C 38/20; C22C 38/22; C22C 38/34; C22C 38/36; C22C 38/38; C22C 38/40; C22C 38/42; C22C 38/44; C22C 38/56; C22C 38/58; B33Y 10/00; B33Y 70/00; Y02P 10/25
See application file for complete search history.

(56) References Cited

U.S. PATENT DOCUMENTS

| | | | |
|---|---|---|---|
| 2013/0065073 A1* | 3/2013 | Fuwa | .............. C22C 33/0285 428/548 |
| 2016/0184893 A1 | 6/2016 | Dave et al. | |

FOREIGN PATENT DOCUMENTS

| | | | |
|---|---|---|---|
| JP | 6-336636 A | | 12/1994 |
| JP | 06336636 A | * | 12/1994 |
| WO | WO 2015/137507 A1 | | 9/2015 |

OTHER PUBLICATIONS

Craeghs, et al., "Feedback control of Layerwise Laser Melting using optical sensors," Physics Procedia, vol. 5, Part. B, pp. 505-514 (Year: 2010).*
Saeidi K., "Transformation of Austenite to Duplex Austenite-ferrite Assembly in Annealed Stainless Steel 316L Consolidated by Laser Melting", Journal of Alloys and Compounds, Feb. 14, 2015, pp. 463-469, vol. 633, XP029145390 (seven (7) pages).
Schumann, H., Metallographie. 8. Auflage. Leipzig: VEB Deutscher Verlag fuer Grundstoffindustrie, 1974. pp. 51-57, including English translation (18 pages).
Davidson K., "Selective Laser Melting of Duplex Stainless Steel Powders: An Investigation", Materials and Manufacturing Processes, Sep. 30, 2015, pp. 1543-1555, vol. 31, No. 12, XP055379622 (14 pages).
English Translation of Japanese-language Office Action issued in Japanese Application No. 2018-548319 dated Jan. 7, 2020 (six (6) pages).
International Preliminary Report on Patentability (PCT/IB/338 & PCT/IB/373) issued in PCT Application No. PCT/EP2017/056056 dated Sep. 18, 2018, including English translation of (Japanese-language Written Opinion (PCT/ISA/237) previously filed on Sep. 14, 2018) (nine (9) pages).
International Search Report (PCT/ISA/210) issued in PCT Application No. PCT/EP2017/056056 dated Jun. 20, 2017 with English translation (eight pages).
German-language Written Opinion (PCT/ISA/237) issued in PCT Application No. PCT/EP2017/056056 dated Jun. 20, 2017 (six pages).
German-language Office Action issued in counterpart German Application No. 10 2016 003 105.0 dated Feb. 13, 2017 (four pages).

* cited by examiner

METHOD FOR PRODUCING COMPONENTS FROM A DUPLEX STEEL, AND COMPONENTS PRODUCED USING SAID METHOD

CROSS REFERENCE TO RELATED APPLICATIONS

This application is a continuation of PCT International Application No. PCT/EP2017/056056, filed Mar. 15, 2017, which claims priority under 35 U.S.C. § 119 from German Patent Application No. 10 2016 003 105.0, filed Mar. 15, 2016, and from German Patent Application No. 10 2017 204 099.8, filed Mar. 13, 2017, the entire disclosures of which are herein expressly incorporated by reference.

BACKGROUND AND SUMMARY OF THE INVENTION

The invention relates to a method for producing components from a duplex steel and components produced using said method.

Components of duplex steel are ordinarily produced from cast or forged components in which austenite is embedded in a ferrite matrix in the form of grains. As a rule, so-called solution annealing is carried out after casting or forging in the temperature range of 850° C. to 1180° C. in order to form grains of the austenite in the ferrite matrix. Accordingly, the properties can be influenced by the structure in addition to the alloy composition.

It is generally known that in many cases, fine-grained structures show improved properties and in particular higher strengths with simultaneously high toughness. However, extremely fine structures cannot be achieved using known methods.

Additive production methods in which a laser beam is guided onto a powder-type material in a locally defined manner are also known. A method of this type is referred to as selective laser melting (SLM) or also as lasercusing. In this process, the powder-type starting material is applied in superposed layers to a substrate, and each layer is then irradiated with the laser beam, wherein the focal point is moved in a locally defined manner along a predefined contour and/or to predefined positions. In the areas of the respective layer that are influenced by the focal point of the laser beam, local melting of the powder-type material occurs, causing the particles of the powder-type material to fuse together. As the focal point is moved further after this melting step, the melt solidifies, and a solid material forms in this area with a porosity that depends on the respective energy density and irradiation time. The porosity can be reduced to zero in these areas. The loose starting powder remains in non-irradiated areas and can be removed and reused after completion of the respective component.

Using the known possibilities, however, it is not possible to obtain sufficiently fine-grained structures. In general, the grain size number G can be determined by various methods, for example according to Euronorm 103-71, DIN EN ISO 642, or ASTM E112-12. The standards require comparison of the grain structure of the sample with standardized micrographs from which a grain size class is derived. In the following, we will carry out determination of average size according to ASTM E112-12, an international standard that is also cited for example in the Appendix of Euronorm 103-71.

ASTM E112-12 defines the grain size number G as the number N of grains per square inch that can be counted at 100× magnification as follows:

$$N_{AE}=S^{G-1}$$

In order to simplify determination of the grain size number, comparison images are provided by ASTM E112-12 for the values G=1 to G=10.

In components produced by this method, the grain size distribution lies in too small a range, so that the austenite grains embedded in the ferrite are too large, which limits strength and toughness.

The object of the invention is therefore to provide possibilities for producing components from a duplex steel that achieve increased strength and toughness.

In the method according to the invention, a powder-type starting material produced from a duplex steel containing an austenitic and a ferritic phase, preferably each in approximately equal portions, as well as further alloy elements is used and melted with a laser beam in a locally defined manner.

However, a metal powder can also be used in which a large portion or even all of the austenite content is dissolved in the ferrite phase during production and is thus not detectably contained as a separate austenite phase. By means of a heat treatment, which will be further discussed below and can be carried out on the actual completed semi-finished product subsequent to melting with the laser beam, preferably after removal of the loose, unmelted powder, formation of the ferrite and austenite phases can then be achieved, even though no or only a small amount of the austenite phase was detectably contained in the starting metal powder.

The molten material solidifies when the laser beam focal point (laser spot) is moved further. Here, the powder-type starting material is applied in layers to a substrate, and the laser beam is directed onto each individual layer after application such that the component is additively constructed in successive layers.

In this case, the composition of the component material changes only minimally, if at all. For example, the ferrite content does not change, which can be demonstrated in the phase diagram by laser diffraction. However, it was not possible to detect any austenite grains in tests conducted with a scanning electron microscope. This is attributed in particular to the extremely short time required by the melt formed with the laser beam to solidify.

For this reason, the component constructed in this way is subsequently subjected to a heat treatment in which solution annealing of the austenitic phase is achieved. The heat treatment is carried out in a temperature range for the respective maximum temperature of between 850° C. and 1100° C., and the component is cooled after a predefinable dwell time has elapsed. Cooling should be carried out in an abrupt manner within a short period of time, which can be achieved by immersion in cold water.

The grain size and the grain size number G of the austenitic phase in the finished structure of the component material are influenced by defined selection of the maximum temperature and/or the dwell time of the respective maximum temperature. In this case, a grain size number G of at least 9 according to ASTM should be maintained.

It applies here in general that the structure formed will become increasingly fine as the selected maximum temperature and dwell time are reduced. However, minimum conditions must be observed, as it is otherwise impossible to form austenite grains in the ferrite by diffusion.

It should be taken into consideration that a higher grain size number G can be observed at a lower maximum temperature and/or a shorter dwell time of the respective maximum temperature.

The dwell time during which the respective maximum temperature is observed should be maintained in the range of 15 min to 10 h.

In this case, a maximum temperature of 1000° C. to 1075° C.±10% in the heat treatment and a heating rate in the range of 150 K/h to 250 K/h should be maintained.

With a dwell time of less than 1 h, preferably ≤0.5 h, and a maximum temperature in the range of 1000° C. to 1075° C., a grain size number G of at least 13, preferably at least 14, can be achieved.

Certain parameters should preferably be maintained within specified parameter ranges. In melting of the powder-type starting material, the focal point of the laser beam should be directed onto the uppermost layer so as to maintain an energy density of at least 40 $J/mm^3$ to a maximum of 150 $J/mm^3$, a feed rate of movement of the focal point in the range of 400 mm/s to 1750 mm/s, preferably 500 mm/s to 1500 mm/s, and a layer thickness of the individual layers formed with the starting material in the range of 15 μm to 50 μm, preferably in the range of 20 μm to 30 μm.

A starting material should be used in production that is composed of an austenitic and a ferritic phase, the proportions of which deviate from one another by a maximum of 10 vol. %, as well as alloy elements selected from chromium, molybdenum, nickel, nitrogen, copper, carbon, tungsten, silicon, and manganese, with a total content of a maximum of 45 wt %, preferably a maximum of 40 wt %, and particularly preferably a maximum of 35 wt %.

It is advantageous if spatially-resolved temperature determination and corresponding locally defined heating of the respective component are carried out during heat treatment. This is of particular importance in components in which different areas showing widely varying wall thicknesses and thus locally differing heat capacities are present.

In this manner, areas of a component having large volume accumulations or wall thicknesses can be additionally heated. This can be achieved using radiation selectively directed onto such areas, such as infrared radiation in particular. This can make it possible to heat these areas in the same way as areas having a thinner-walled configuration and to avoid temperature gradients within the component. For this purpose, additional radiation sources can be present in or on a conventional oven that additionally heat the critical areas of the respective component that would otherwise heat up more slowly.

Thinner walled areas of a component can also be cooled independently or additionally hereto, while thicker-walled or large-volume areas of a component are not cooled or are additionally heated. For cooling purposes, cooling elements may be present in an oven in the vicinity of correspondingly critical areas that are to be cooled to the extent possible. A cooled gas flow can also be directed onto such thin-walled areas.

For locally defined heating, one can use at least one temperature sensor, by means of which the respective temperatures in the variously dimensioned areas can be determined, preferably without contact. For example, this can be a pyrometer that is pivotable and/or moveable in another manner. Using the temperature measurement values thus determined in a spatially resolved manner, the correspondingly arranged and/or aligned cooling elements can be correspondingly controlled in order to allow temperatures to be maintained throughout the entire volume of the component that are identical, or at least virtually identical, at the same times.

In the following, the invention will be explained in further detail by means of examples. The parameters given here, however, can also be modified such that a structure is obtained that corresponds to a minimum number of austenitic grains in the ferrite of the finished produced component with a grain size number G of at least 9, and preferably with a higher grain size number G. In particular, these parameters can be other maximum temperatures and dwell times thereof in the heat treatment leading to dissolution of the austenite.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
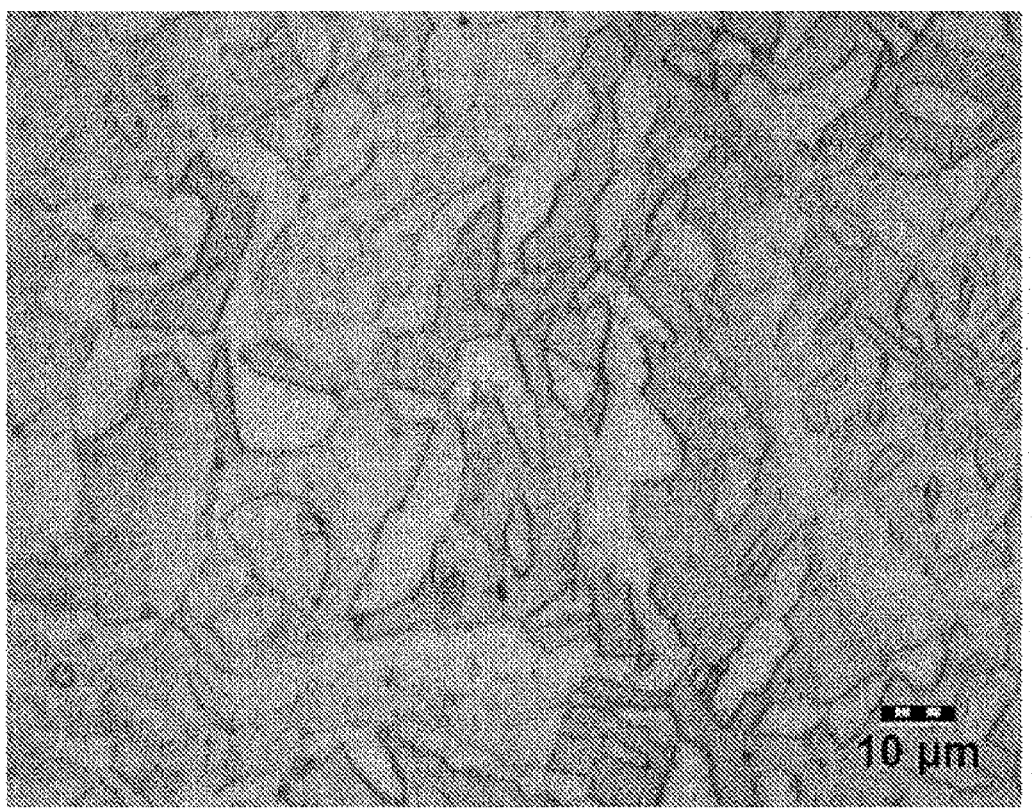
FIG. 1 is a micrograph of a sample of a component produced according to an embodiment of the invention with a maximum temperature of 1065° C. in heat treatment maintained over a period of 8 h.

The powder-type starting material used in the examples, with the trade name NORIDUR, had the following composition:

Carbon 0.036 wt %, silicon 0.6 wt %, manganese 0.63 wt %, sulfur 0.015 wt %, chromium 24.8 wt %, nickel 7 wt %, molybdenum 2.32 wt %, copper 2.93 wt %, and nitrogen 0.18 wt %.

The three respective samples shown were irradiated with a laser beam having a power of 90 W, with a distance of 56 μm between tracks arranged adjacent to one another that are covered by the feed motion of the focal point of the laser beam. The laser beam was focused such that an energy density of 70 $J/mm^3$ was maintained at the focal point. The focal point was moved at a feed rate of 600 mm/s over the surface of the respective individual layers formed from the starting material.

In this case, a porosity of 0.5% was achieved in the component material.

After the additive construction of the components in layers, various parameters for heat treatment were selected.

In the sample shown in FIG. 1, for example, a maximum temperature of 1065° C. was selected for heat treatment. This maximum temperature was maintained for 8 h. This resulted in a grain size number G of the austenite embedded in the ferrite of 11.31. The heat treatment was carried out with a heating rate of 200 K/h. After the dwell time of 8 h had elapsed, the heat-treated component was cooled in water at a temperature of 20° C.

Figure 2:
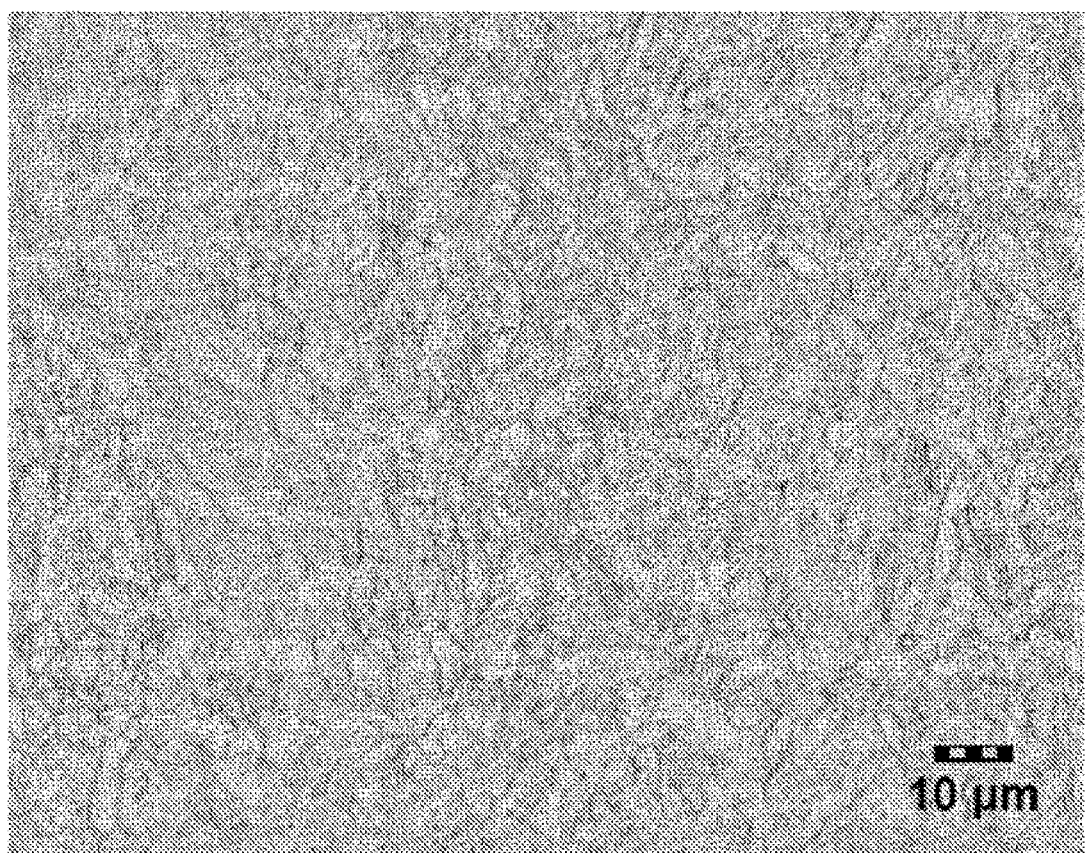
FIG. 2 is a micrograph of a sample of a component produced according to an embodiment of the invention with a maximum temperature of 1065° C. in heat treatment maintained over a period of 0.5 h.

For the sample shown in the micrograph of FIG. 2, a maximum temperature of 1065° C. was selected for heat treatment. This maximum temperature was maintained for a period of 0.5 h. This resulted in a grain size number G of the austenite embedded in the ferrite of 14.14. The heat treatment was carried with a heating rate of 200 K/h. After the dwell time of 0.5 h had elapsed, the heat-treated component was cooled in water at a temperature of 20° C.

Figure 3:
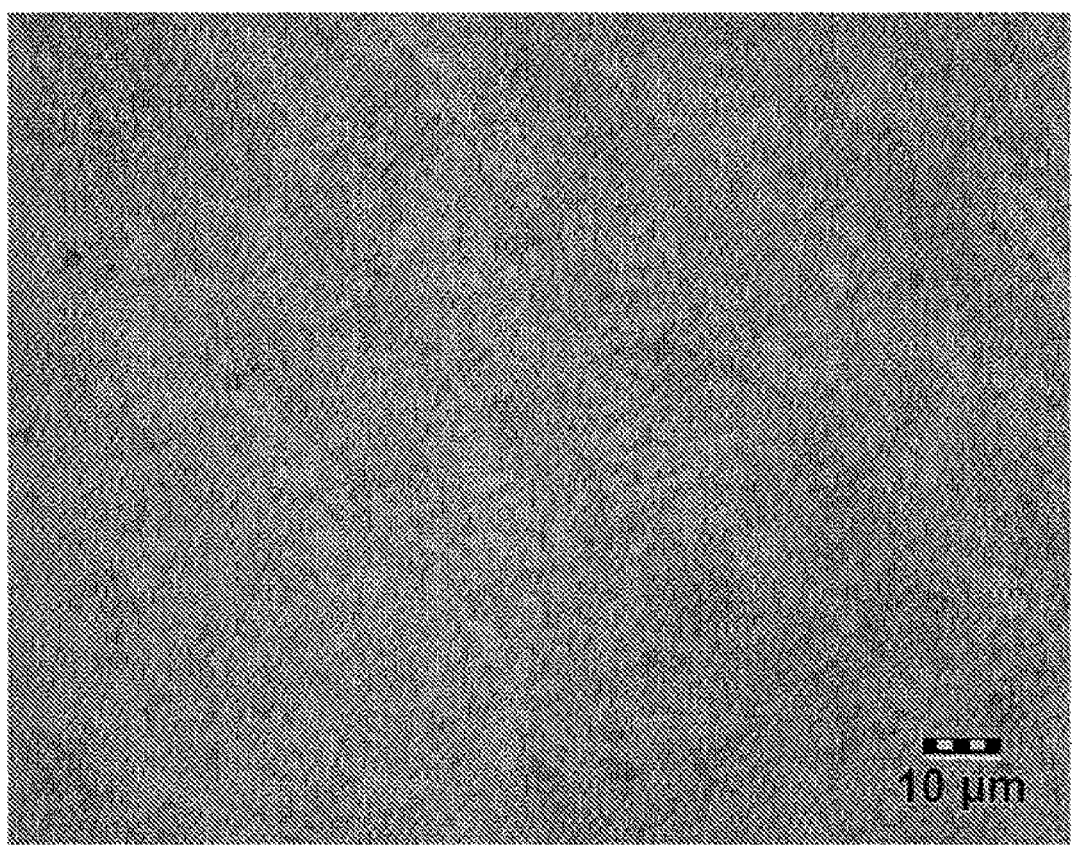
FIG. 3 is a micrograph of a sample a of a component produced according to an embodiment of the invention with a maximum temperature of 1000° C. in heat treatment maintained over a period of 0.5 h.

For the sample shown in the micrograph in FIG. 3, a maximum temperature of 1000° C. was selected for heat treatment. This maximum temperature was maintained for a period of 0.5 h. This resulted in a grain size number G of the austenite embedded in the ferrite of 14.83. The heat treatment was carried out with a heating rate of 200 K/h. After the dwell time of 0.5 h had elapsed, the heat-treated component was cooled in water at a temperature of 20° C.

It can therefore be clearly seen that the grain size number G is increased and finer structures are thus obtained when the amount of energy input during heat treatment is reduced. However, one should maintain a minimum energy level that produces dissolution of the austenite phase from the ferrite phase and embedding of austenite grains in a ferrite matrix.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing components from a duplex steel, the produced components having an austenitic phase embedded in a ferritic matrix in the form of grains, comprising the steps of:
    providing a powdered duplex steel starting material containing at least an austenitic phase and a ferritic phase;
    applying the starting material to a substrate in layers;
    locally melting the starting material with a laser beam directed onto each individual layer after layer application to form a component;
    subjecting the component constructed to a solution annealing heat treatment carried out in a temperature range having a maximum temperature of between 850° C. and 1100° C.;
    cooling the component after a predetermined heat treatment dwell time,
    wherein
    during the solution annealing heat treatment step, a temperature of the component at a plurality of locations is determined and location-specific heating of the component at the plurality of locations is carried out to minimize temperature differences in the component,
    a grain size of grains in the component formed by the heat treatment and cooling steps is such that an ASTM grain size number G of the austenitic phase of at least 9 is obtained, and
    the produced component material has a porosity of 0.5 vol % or less.

2. The method according to claim 1, wherein
the maximum temperature in the heat treatment step is 1000° C. to 1075° C.

3. The method according to claim 1, wherein
the predetermined dwell time is between 15 minutes to 10 hours.

4. The method according to claim 3, wherein
the maximum temperature in the heat treatment step is 1000° C. to 1075° C.

5. The method according to claim 4, wherein
the dwell time is less than 1 hour, and
the grain size number G is at least 13.

6. The method according to claim 1, wherein
in the melting step, a focal point of the laser beam is directed onto an uppermost layer of the starting material such that an energy density of between 40 J/mm$^3$ and 150 J/mm$^3$ is provided to the starting material when a feed rate of movement of the focal point is between 400 mm/s to 1750 mm/s and a layer thickness of the individual layers formed with the starting material is between 15 μm to 50 μm.

7. The method according to claim 6, wherein
the feed rate is between 500 mm/s and 1500 mm/s, and
the layer thickness is between 20 μm to 30 μm.

8. The method according to claim 1, wherein
volume percentages of the austenitic phase and the ferritic phase in the starting material deviate from one another by a maximum of 10 vol. %, and
alloy elements selected from one or more of chromium, molybdenum, nickel, nitrogen, copper, carbon, tungsten, silicon and manganese are a maximum of 45 wt % of the starting material.

* * * * *